United States Patent
Hansen et al.

(10) Patent No.: US 9,592,756 B1
(45) Date of Patent: Mar. 14, 2017

(54) SEAT ASSEMBLIES FOR VEHICLES

(71) Applicant: Toyota Motor Engineering & Manufacturing North America, Inc., Erlanger, KY (US)

(72) Inventors: Charles S. Hansen, Northville, MI (US); Todd R. Muck, Fowlerville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/881,473

(22) Filed: Oct. 13, 2015

(51) Int. Cl.
 *B60N 2/005* (2006.01)
 *B60N 2/44* (2006.01)
 *B60N 2/20* (2006.01)

(52) U.S. Cl.
 CPC .......... *B60N 2/4435* (2013.01); *B60N 2/005* (2013.01); *B60N 2/206* (2013.01)

(58) Field of Classification Search
 CPC ....... B60N 2/4435; B60N 2/005; B60N 2/206
 USPC ..................................................... 296/65.16
 See application file for complete search history.

(56) References Cited

U.S. PATENT DOCUMENTS

| | | | |
|---|---|---|---|
| 2,428,217 A | 9/1947 | Hedley et al. | |
| 4,621,867 A | 11/1986 | Perring et al. | |
| 4,909,570 A | 3/1990 | Matsuhashi | |
| 5,524,504 A | 6/1996 | Brandoli et al. | |
| 6,698,835 B2 * | 3/2004 | Kojima ................ | B60N 2/0881 248/429 |
| 6,935,691 B1 | 8/2005 | Sasaki et al. | |
| 7,753,429 B2 * | 7/2010 | Villeminey .......... | B60N 2/2209 296/65.05 |
| 7,971,920 B2 * | 7/2011 | Jang ...................... | B60N 2/123 296/65.01 |
| 8,047,614 B2 * | 11/2011 | Goshima ............... | B60N 2/366 296/65.16 |
| 8,408,630 B2 * | 4/2013 | Saito ..................... | B60N 2/366 296/65.13 |
| 2014/0191553 A1 * | 7/2014 | Blendea ................. | B60N 2/20 297/354.1 |
| 2014/0327266 A1 * | 11/2014 | Gholap ................. | B60N 2/442 296/65.16 |

\* cited by examiner

*Primary Examiner* — Pinel Romain
(74) *Attorney, Agent, or Firm* — Dinsmore & Shohl LLP

(57) ABSTRACT

Seat assemblies for vehicles are disclosed. A seat assembly for a vehicle includes a back portion, a seat portion pivotably connected to the back portion, a first release assembly connected to the back portion and the seat portion, a second release assembly connected to the seat portion, and a handle mechanically coupled to the first release assembly and the second release assembly. The first release assembly is configured to transition between a locked configuration and an unlocked configuration. The second release assembly is configured to transition between an engaged configuration and a disengaged configuration. When the handle is rotated from a first position to a second position, the first release assembly transitions between the locked configuration and the unlocked configuration such that the back portion pivots relative to the seat portion, and the second release assembly transitions between the engaged configuration and the disengaged configuration.

20 Claims, 4 Drawing Sheets

SEAT ASSEMBLIES FOR VEHICLES

TECHNICAL FIELD

The present specification generally relates to seat assemblies for vehicles. More particularly, the present specification relates to seat assemblies comprising a first release assembly and a second release assembly configured to be simultaneously released upon actuation of a handle.

BACKGROUND

Vehicles include vehicles seats, the position of which may need to be adjusted for a variety of reasons, such as to free up cargo space, to allow passengers to enter and exit the vehicle, or the like.

Accordingly, a need exists for vehicle seat assemblies including release mechanisms that allow for vehicle seats to be adjusted as desired.

SUMMARY

In one embodiment, a seat assembly for a vehicle includes a back portion, a seat portion pivotably connected to the back portion, a first release assembly connected to the back portion and the seat portion, a second release assembly connected to the seat portion, and a handle mechanically coupled to the first release assembly and the second release assembly. The first release assembly is configured to transition between a locked configuration and an unlocked configuration. The second release assembly is configured to transition between an engaged configuration and a disengaged configuration. When the handle is rotated from a first position to a second position, the first release assembly transitions between the locked configuration and the unlocked configuration such that the back portion pivots relative to the seat portion, and the second release assembly transitions between the engaged configuration and the disengaged configuration.

In another embodiment, a vehicle includes a vehicle floor, at least one rail fixedly connected to the vehicle floor, and a seat assembly slidably and releasably connected to the at least one rail. The seat assembly includes a seat portion pivotably connected to a back portion, a first release assembly connected to the back portion and the seat portion, a second release assembly connected to the seat portion, and a handle mechanically coupled to the first release assembly and the second release assembly. The first release assembly is configured to transition between a locked configuration and an unlocked configuration. The second release assembly is configured to transition between an engaged configuration and a disengaged configuration. When the handle is rotated from a first position to a second position, the first release assembly transitions between the locked configuration and the unlocked configuration such that the back portion pivots relative to the seat portion, and the second release assembly transitions between the engaged configuration and the disengaged configuration such that the seat portion is released from the at least one rail and is allowed to slide along the at least one rail.

In another embodiment, a seat assembly for a vehicle is provided, the seat assembly configured to connect to a rail. The seat assembly includes a seat portion pivotably connected to a back portion, a first release assembly configured to transition between a locked configuration and an unlocked configuration of the back portion, a second release assembly configured to transition between an engaged configuration and a disengaged configuration of the seat portion relative to the rail and a handle mechanically coupled to the first release assembly and the second release assembly. When the handle is rotated from a first position to a second position, the first release assembly transitions between the locked configuration and the unlocked configuration such that the back portion pivots relative to the seat portion, and the second release assembly transitions between the engaged configuration and the disengaged configuration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Seat assemblies for vehicles are disclosed. A seat assembly includes a first release assembly adapted to allow a back portion of the seat assembly to pivot relative to a seat portion of the seat assembly, a second release assembly adapted to allow the seat portion to slide along at least one rail, and a handle that, upon actuation, simultaneously releases the first release assembly and the second release assembly, thereby allowing the seat back to pivot relative to the seat portion and the seat portion to slide along the at least one rail simultaneously. The simultaneous disengagement of both the first release assembly and the second release assembly allows a user to slide the seat forward without first having to rotate the back portion of the seat assembly to a forward position. Various seat assemblies for vehicles will now be disclosed.

Figure 1:
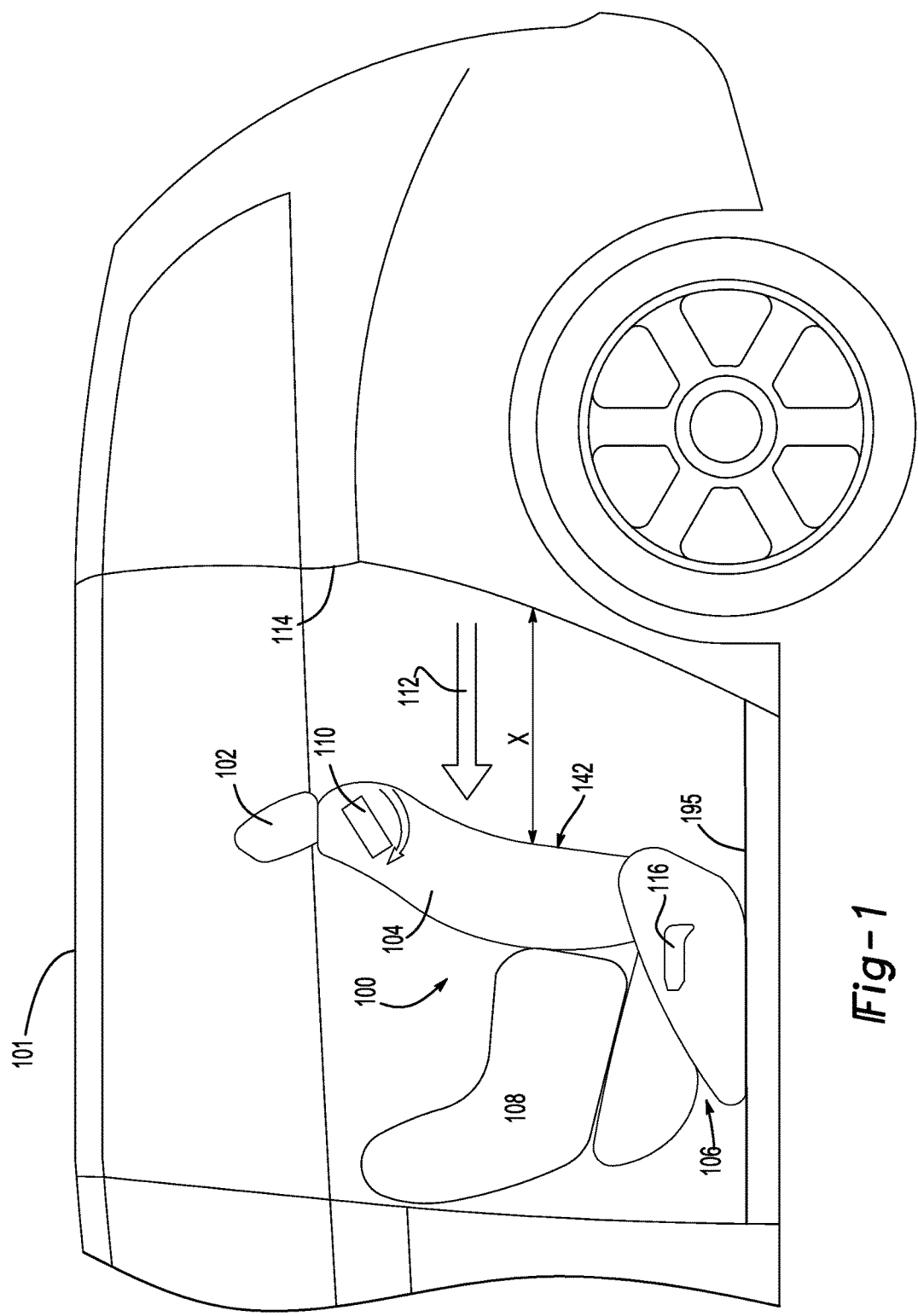
FIG. 1 illustrates a side view of a seat assembly including first and second release assemblies, according to one or more embodiments shown and described herein.

A seat assembly 100 is illustrated in FIGS. 1-4. With reference to FIG. 1, the seat assembly 100 within a vehicle 101 includes a headrest 102, a back portion 104, a seat portion 106, a handle 110, and an auxiliary handle 116. The back portion 104 is pivotally connected to the seat portion 106. A child seat 108 may be installed on the seat assembly 100. The seat assembly 100 further includes a first release assembly and a second release assembly (hidden within the seat assembly 100 of FIG. 1) which will be discussed in greater detail in the following.

Figure 2:
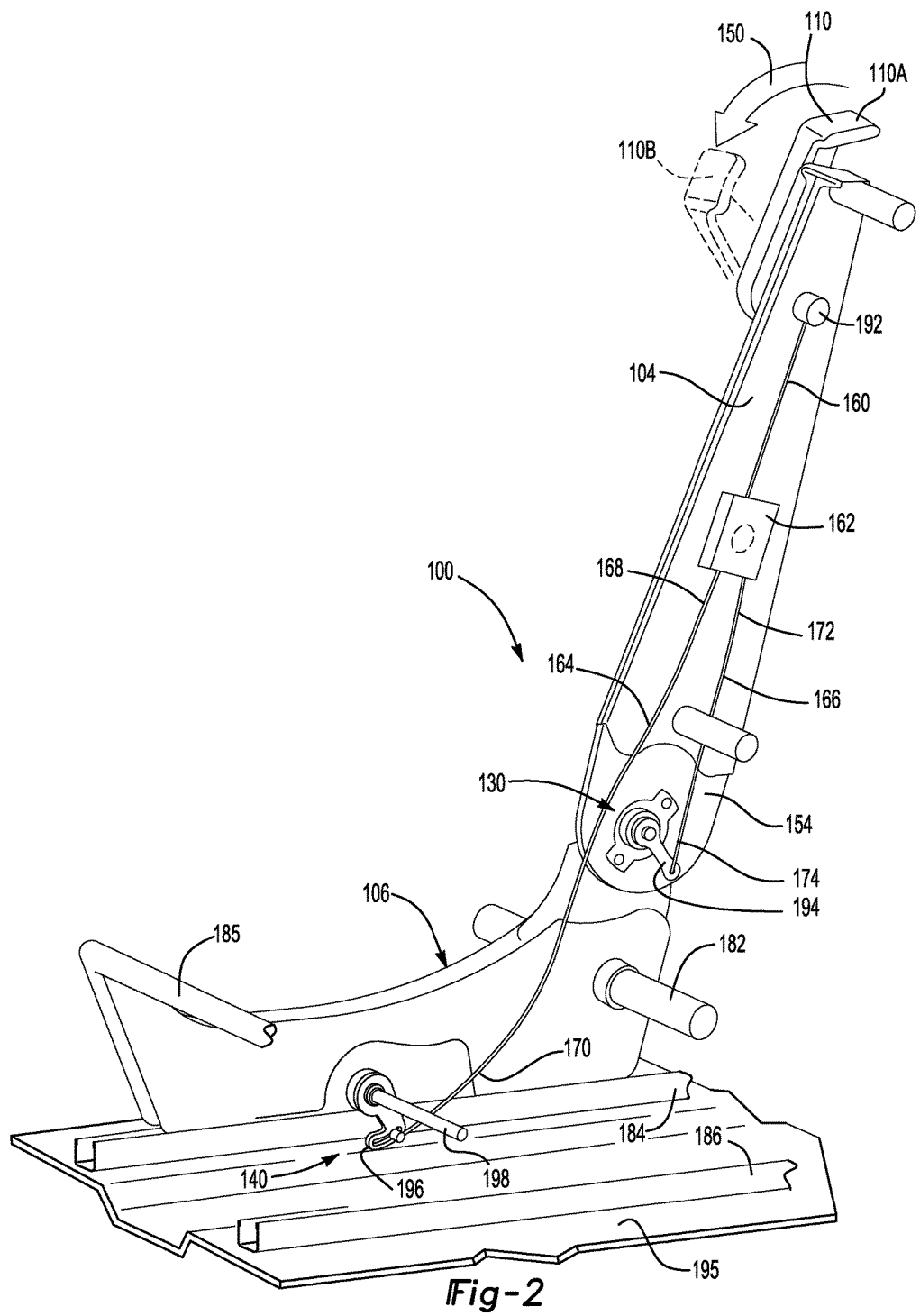
FIG. 2 illustrates a perspective view of a cable assembly, a first release assembly, and a second release assembly, according to one or more embodiments shown and described herein.

FIG. 2 illustrates the back portion 104 connected to the seat portion 106. As shown in FIG. 2, the partially shown back portion 104 includes a generally planar member configured to hold a portion of the cables 160, 164, 166. The first release assembly 130 connects to a lower end 154 of the back portion 104. The back portion 104 further includes an upper end where the handle 110 is mounted. It should be appreciated that, in other embodiments, the portion of the back portion 104 illustrated can have other similar shapes and dimensions. Similarity, as shown in FIG. 2, in other embodiments, the seat portion 106 can have other similar shapes and dimensions. The seat portion 106 may further include cross beams 182, 185 to facilitate support within the seat portion 106. The cross beams 182, 185 may also be configured to hold a seat cushion or other foam (not shown). Some embodiments may not include the cross beams 182, 185.

The handle 110 is mechanically connected to the first release assembly 130 and the second release assembly 140 by a plurality of cables. The handle 110 includes a connection portion 192 that extends through the back portion 104. A first end of a first cable 160 is connected to the connection portion 192 of the handle 110. The first cable 160 connects the handle 110 to the cable splitter 162 at a second end of the first cable 160.

A second cable 164 and a third cable 166 are also connected to the cable splitter 162. The second cable 164 connects the cable splitter 162 to the second release assembly 140. The second cable 164 includes a first end 168 connected to the cable splitter 162 and a second end 170 connected to the second release assembly 140. More specifically, the second cable 164 extends from the cable splitter 162 to the second release assembly 140. Similarly, a third cable 166 connects the cable splitter 162 to the first release assembly 130. More specifically, the third cable 166 extends from the cable splitter 162 to the first release assembly 130. The third cable 166 includes a first end 172 connected to the cable splitter 162 and a second end 174 connected to the first release assembly 130.

A pair of rails 184, 186 are shown in FIG. 2 securely mounted to a vehicle floor 195. The second release assembly 140 connects directly to the rail 184. In alternative embodiments, a mirrored second release assembly (not shown) may connect directly to the rail 186. Further, in alternative embodiments, only a single rail may be provided. The rails 184, 186 have a generally u-shaped cross-section. The rails 184, 186 connect directly to the vehicle floor 195 by a plurality of fasteners and/or adhesives to securely lock the rails 184, 186 to the vehicle floor. In other embodiments, the rails 184, 186 may be indirectly mounted to the vehicle floor 195 by one or more attachment structures.

Figure 3:
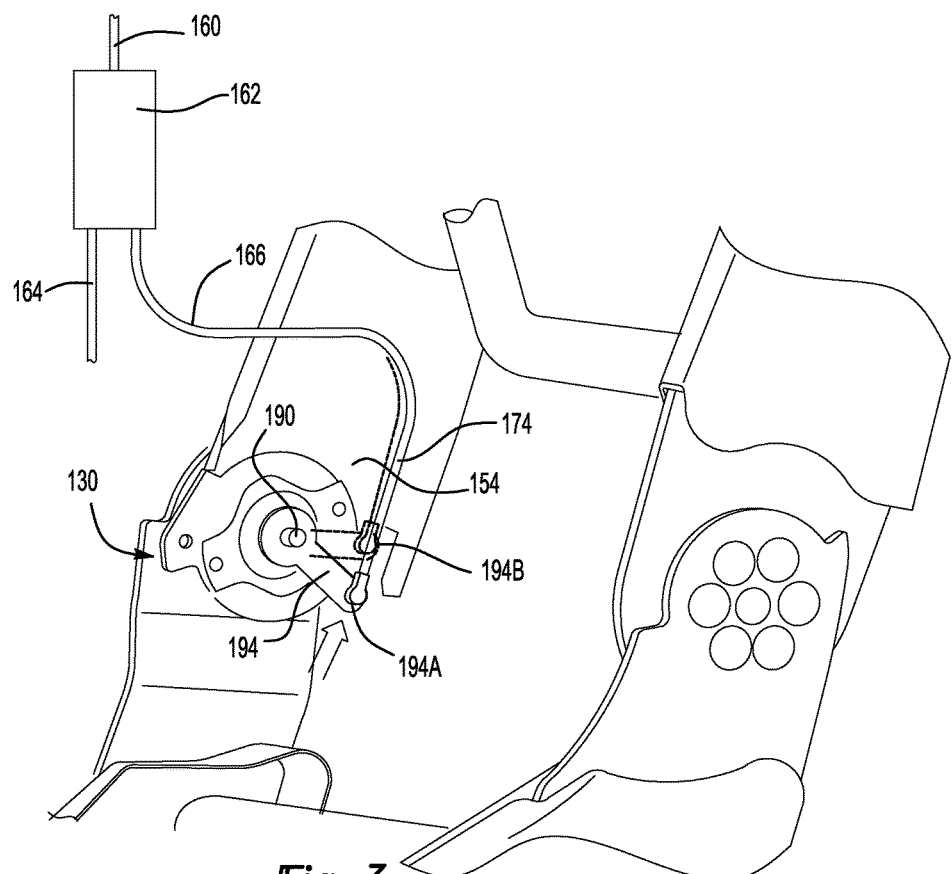
FIG. 3 illustrates a perspective view of a first release assembly connected to a cable, according to one or more embodiments shown and described herein.

With reference to FIGS. 2 and 3, the first release assembly 130, which controls the pivotable movement of the back portion 104 with respect to the seat portion 106 (i.e. forward rotation, fold forward or recline) includes a rotatable lever 194 connected to the third cable 166 in communication with the handle 110. The first release assembly 130 is positioned at a pivot point 190 between the back portion 104 and the seat portion 106. The first release assembly 130 allows the seat to recline or move to a forward rotated position. The first release assembly 130 includes the lever 194 configured to rotate when force is applied from the third cable 166. The first release assembly 130 includes the pivot point 190 whereby the back portion 104 is configured to pivot and recline in relation and with respect to the seat portion 106.

Figure 4:
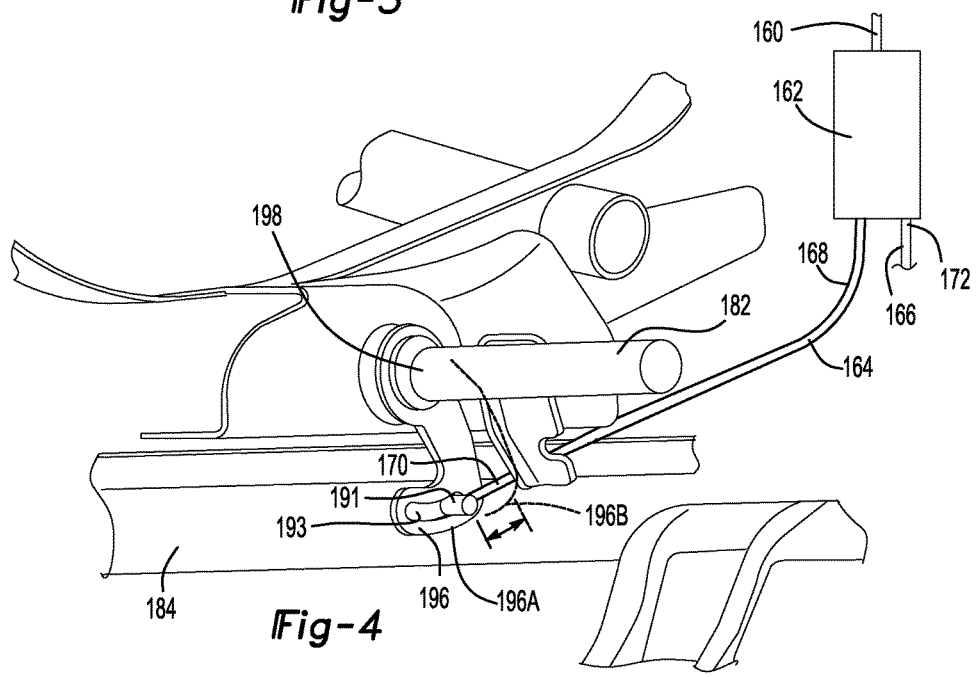
FIG. 4 illustrates a perspective view of a second release assembly connected to a cable, according to one or more embodiments shown and described herein.

With reference to FIG. 4, the second release assembly 140 includes a main pivot point 198 whereby a lever 196 is adapted to rotate about. The lever 196 includes an aperture 193 for holding a connector 191. The connector 191 connects the lever 196 to the second end 170 of the second cable 164.

Figure 5:
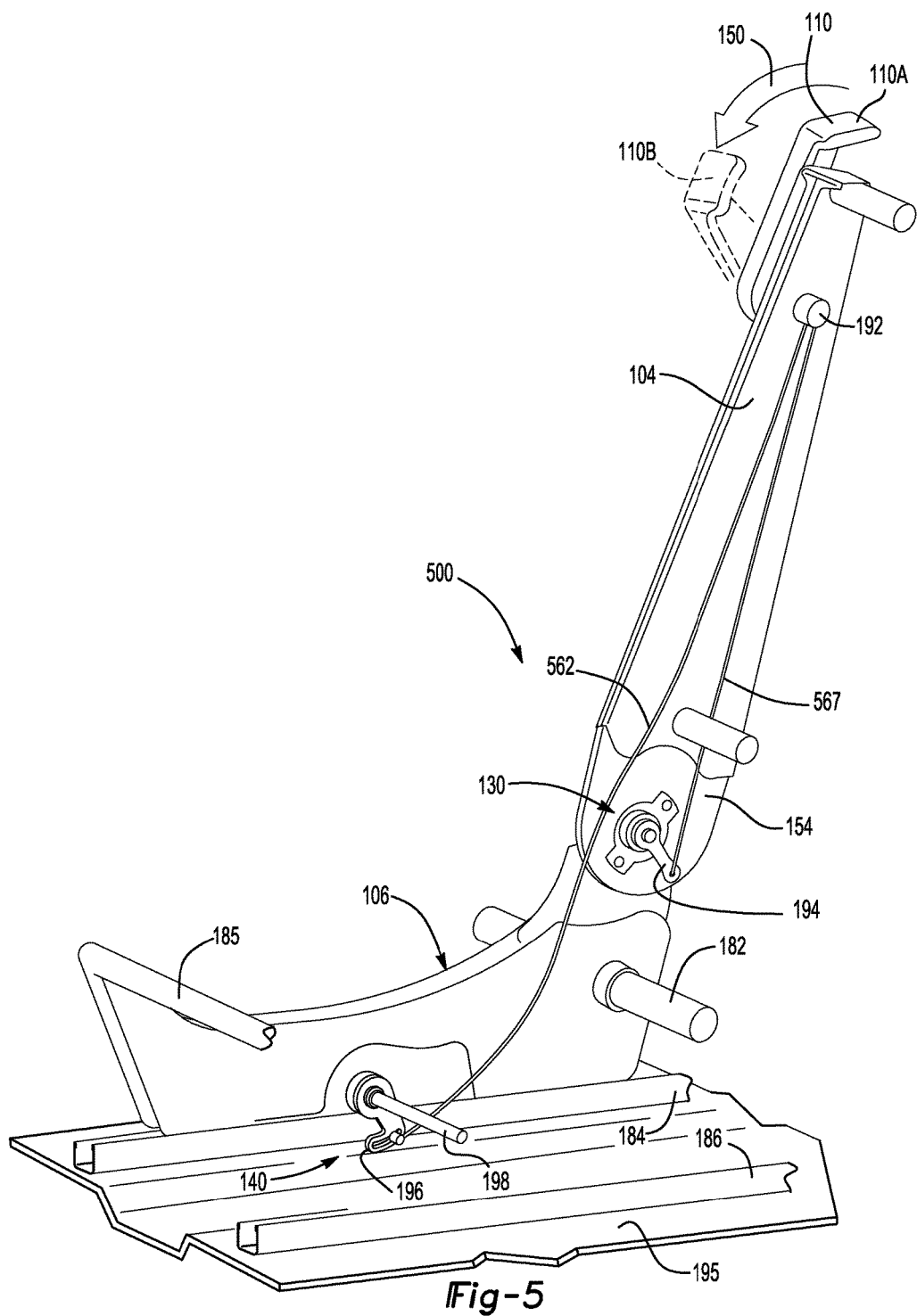
FIG. 5 illustrates a perspective view of a cable assembly, a first release assembly, and a second release assembly, according to one or more embodiments shown and described herein.

In some embodiments, such as the seat assembly 500 depicted in FIG. 5, no cable splitter is used. In these embodiments, a first cable 565 extends directly between the handle 110 and the first release assembly 130. Similarity, a second cable 567 extends between the handle 110 directly to the second release assembly 140.

In some embodiments, the first release assembly 130, the second release assembly 140, the corresponding levers and the other parts of the assemblies are made of a plastic, plastic like, polymer or polymer like material. In other embodiments, the first release assembly 130, the second release assembly 140, the corresponding levers and the other parts of the assemblies may be made of a metal, such as aluminum or steel.

In some embodiments, the cables 160, 164, 166 are other materials such as standard metal wire cables with a polymer or plastic coating. In other embodiments, wires or plastic cables may be used.

The seat assembly 100 is adapted to slide to a forward position, such as illustrated in FIG. 1, upon actuation of the handle 110. Referring to FIGS. 1-2, actuation of the handle 110 releases both the first release assembly 130 and the second release assembly 140 to both pivot the back portion 104 forward and slide the seat assembly 100 forward after releasing the second release assembly 140 from the rails 184, 186. When the handle 110 is rotated from a first position 110A to a second position 110B, the first release assembly 130 moves between a locked configuration 194A and an unlocked configuration 194B (as shown in FIG. 3). Likewise, when the handle 110 is rotated from a first position 110A to a second position 110B, the second release assembly 140 moves between a locked or engaged configuration 196A and an unlocked or disengaged configuration 196B (as shown in FIG. 4). Actuation of the handle 110 simultaneously releases the first release assembly 130 and the second release assembly 140 thereby allowing a forward sliding movement of the seat assembly 100 without necessitating pivoting of the back portion 104 prior to disengagement of the second release assembly 140.

The handle 110 is configured to pull the cables connected to the first release assembly 130 and the second release assembly 140 to allow for movement of both reclining movement of the back portion 104 and sliding movement of the seat portion 106. Referring to FIG. 2, as the handle 110 is rotated from a first position 110A to a second position 110B, as illustrated by directional arrow 150, both the first release assembly 130 and the second release assembly 140 are activated so as to allow unlocking and movement at the connection points. As the handle 110 is rotated from the first position 110A to the second position 110B, the first cable 160 is pulled and thus a similar pulling is transferred to the second cable 164 and the third cable 166 to activate the first release assembly 130 and the second release assembly 140 simultaneously allowing for a forward sliding movement of the seat even if a child seat 108 is installed on the seat assembly 100.

With reference to FIG. 3 in conjunction with FIG. 1, the first release assembly 130 controls the recline movement of the back portion 104. When the third cable 166 pulls on the lever 194, the lever 194 is rotated to unlock the back portion 104 from the seat portion 106 thereby allowing the back portion 104 to pivot about the pivot point 190. The lever is rotatable from a locked configuration 194A to an unlocked configuration 194B, such as shown in FIG. 3. In locked configuration 194A, the first release assembly 130 is in a locked configuration. In the unlocked configuration 194B, the lever 194 actuates and releases allowing the back portion 104 to pivot (i.e. recline) with respect to the seat portion 106. The third cable 166 is connected to the lever 194 by means of any standard connection such as fastener, adhesive or tying. Accordingly, as the handle 110 is rotated to the second position 110B, the first release assembly 130 releases the lock and thus allows the seat back 104 to pivot about the pivot point 190.

With reference to FIG. 4 in conjunction with FIG. 2, the second release assembly 140 controls the sliding movement of the seat portion 106 on the rails 184, 186. Simultaneously while the first release assembly 130 assembly is unlocking, the second release assembly 140 is also disengaging. The second release assembly 140 controls the connection between the seat portion 106 and the at least one rail. As the second cable 164 is pulled, the lever 196 rotates about the pivot point 198 thereby unlocking the second release assembly 140 and releasing the connection between the seat portion 106 and the rails 184, 186. In the embodiment as illustrated in FIG. 4, the rail 184 is shown with the second release assembly 140 connected thereto. In other embodiments, a second release assembly may also be provided on the respective second rail. As the second cable 164 is pulled, the lever 196 rotates about the pivot point 198 thereby engaging the second release assembly 140 and releasing the connection between the seat portion 106 and the rails 184, 186. In the embodiment as illustrated in FIG. 4, a single rail 184 is shown with the second release assembly 140 connected thereto. The lever 196 is rotatable form a engaged configuration 196A to a disengaged configuration 196B. When the lever 196 is in the engaged configuration 196A, the second release assembly 140 is in a locked condition. When the lever is rotated to the disengaged 196B, the second release assembly 140 disengages from the rails 184, 186. As the handle 110 is rotated to the second position 110B, the second release assembly 140 disengages from the rails 184, 186 (by means of the lever 196) thereby allowing a forward sliding movement of the seat assembly 100 on the rails 184, 186.

Accordingly, the seat portion 106 of the seat assembly 100 is slidably and releasably connected to the at least one rail 184. The second release assembly 140 is provided connecting the seat portion 106 to the at least one rail 184 where the second release assembly 140 adapted to release the seat portion 106 from the at least one rail 184 allowing the seat portion 106 to slide along the at least one rail 184 after the lever 196 moves from the engaged configuration 196A to the disengaged configuration 196B.

Referring to FIG. 1, a rear surface 142 of the back portion 104 is spaced apart from the door 114 by a distance X. The embodiments described herein provide for a simultaneous disengagement of both the first release assembly 130 and the second release assembly 140 allows the user to slide the seat forward without first having to rotate the back portion 104 of the seat assembly 100 to a forward position. Movement of the seat assembly 100 to a forward position does not require a first forward rotation of the seat back 104 to disengage the seat assembly from the rail. Accordingly, if a child seat 108 is connected to the seat assembly 100, the user is still able to move the seat assembly 100 to a forward position and is thus capable of accessing a rear area of the vehicle.

In other embodiments, a single release assembly, or two release assemblies, on respective sides of the seat assembly may also be provided (i.e. another second release assembly 140). The release assembly (such as the second release assembly 140) may also be directly connected to an auxiliary handle, such as the auxiliary handle 116 as illustrated in FIG. 1. Actuation of the auxiliary handle 116 would allow direct movement of the seat assembly 100 in a sliding forward position without having to actuate the handle 110. The second cable 164 connects directly to the lever 196 at the second end 170 of the second cable 164. When the second cable 164 is pulled, the lever 196 then rotates and releases the second release assembly. The second cable connects to the lever 196 by means of any standard connection such as fastener, adhesive or tying.

Referring now to FIG. 5, the handle 110 is configured to simultaneously pull a first cable 567 and a second cable 562 to allow for movement of both reclining movement of the back portion 104 and sliding movement of the seat portion 106. The first cable 567 is connected to the first release assembly 130. The second cable 562 is connected to the second release assembly 140. to allow for movement of both reclining movement of the back portion 104 and sliding movement of the seat portion 106. As the handle 110 is rotated from a first position 110A to a second position 110B, as illustrated by directional arrow 150, both the first release assembly 130 and the second release assembly 140 are activated so as to allow unlocking and movement at the connection points. As the handle 110 is rotated from the first position 110A to the second position 110B, the first cable 567 is pulled. The second cable 562 is simultaneously pulled activating the first release assembly 130 and the second release assembly 140 simultaneously allowing for a forward sliding movement of the seat even if a child seat 108 is installed on the seat assembly 100.

It should be understood that the seat assemblies disclosed herein include a first release assembly adapted to allow a back portion to pivot relative to a seat portion, a second release assembly adapted to allow the seat portion to slide along at least one rail, and a handle that, upon actuation, simultaneously releases the first release assembly and the second release assembly, thereby allowing the seat back to pivot relative to the seat portion and the seat portion to slide simultaneously. Such simultaneous disengagement of both the first release assembly and the second release assembly may allow a user to slide a vehicle seat forward without first having to rotate the back portion of the seat assembly to a forward position, which may save time and be more convenient for the user.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A seat assembly for a vehicle comprising:
a back portion;
a seat portion pivotably connected to the back portion;
a first release assembly connected to the back portion, the first release assembly configured to transition between a locked configuration and an unlocked configuration, in the unlocked configuration the back portion is pivotal relative to the seat portion;

a second release assembly connected to the seat portion, the second release assembly configured to transition between a locked configuration and an unlocked configuration; and a handle mechanically coupled to the first release assembly and the second release assembly, wherein when the handle is rotated from a first position to a second position both the first release assembly and the second release assembly transition between the locked configuration and the unlocked configuration.

2. The seat assembly of claim 1 wherein a first cable connects the handle to a cable splitter, a second cable connects the cable splitter to the second release assembly, and a third cable connects the cable splitter to the first release assembly.

3. The seat assembly of claim 1 wherein a first cable extends from the handle and connects the handle to the first release assembly, and wherein a second cable extends from the handle and connects the handle to the second release assembly.

4. The seat assembly of claim 1 wherein the second release assembly connects to at least one rail, the at least one rail connected to a floor of the vehicle.

5. The seat assembly of claim 1 wherein a second handle is provided on the seat portion, the second handle in direct communication with the second release assembly and adapted to release the second release assembly from at least one rail.

6. The seat assembly of claim 1 wherein the first release assembly includes a rotatable lever, the lever connected to a cable in communication with the handle.

7. The seat assembly of claim 1 wherein the first release assembly is positioned at a main pivot point between the back portion and the seat portion, the first release assembly allowing the seat to recline or move to a forward rotated position.

8. The seat assembly of claim 1 wherein the second release assembly includes a rotatable lever, the lever connected to a cable in communication with the handle.

9. A vehicle comprising:
a vehicle floor;
at least one rail fixedly connected to the vehicle floor;
a seat assembly slidably and releasably connected to the at least one rail, wherein the seat assembly comprises:
a seat portion pivotably connected to a back portion;
a first release assembly connected to the back portion, the first release assembly configured to transition between a locked configuration and an unlocked configuration, in the unlocked configuration the back portion is pivotal relative to the seat portion;
a second release assembly connected to the seat portion, the second release assembly configured to transition between a locked configuration and an unlocked configuration, in the unlocked configuration of the second release assembly the seat portion is released from the at least one rail and is allowed to slide along the at least one rail; and
a handle mechanically coupled to the first release assembly and the second release assembly,
wherein when the handle is rotated from a first position to a second position both the first release assembly and the second release assembly transition between the locked configuration and the unlocked configuration.

10. The vehicle of claim 9 wherein a first cable connects the handle to a cable splitter, a second cable connects the cable splitter to the second release assembly, and a third cable connects the cable splitter to the first release assembly.

11. The vehicle of claim 9 wherein a first cable extends from the handle and connects the handle to the first release assembly, and wherein a second cable extends from the handle and connects the handle to the second release assembly.

12. The vehicle of claim 9 wherein the at least one rail includes two total rails.

13. The vehicle of claim 12 wherein a second handle is provided on the seat portion, the second handle in direct communication with the second release assembly and adapted to release the second release assembly from the at least one rail.

14. The vehicle of claim 11 wherein the first release assembly includes a rotatable lever, the lever connected to a cable in communication with the handle.

15. The vehicle of claim 14 wherein the first release assembly is positioned at a main pivot point between the back portion and the seat portion, the first release assembly allowing the seat to recline or move to a forward rotated position.

16. The vehicle of claim 10 wherein the second release assembly includes a rotatable lever, the lever connected to a cable in communication with the handle.

17. A seat assembly for a vehicle, the seat assembly configured to connect to a rail, the seat assembly comprising:
a seat portion pivotably connected to a back portion;
a first release assembly configured to transition between a locked configuration and an unlocked configuration of the back portion;
a second release assembly configured to transition between a locked configuration and an unlocked configuration of the seat portion relative to the rail; and
a handle mechanically coupled to the first release assembly and the second release assembly,
wherein when the handle is rotated from a first position to a second position both the first release assembly and the second release assembly transition between the locked configuration and the unlocked configuration.

18. The seat assembly of claim 17 wherein the first release assembly includes a rotatable lever, the lever connected to a cable in communication with the handle.

19. The seat assembly of claim 17 wherein the first release assembly is positioned at a main pivot point between the back portion and the seat portion, the first release assembly allowing the seat to recline or move to a forward rotated position.

20. The seat assembly of claim 17 wherein the second release assembly includes a rotatable lever, the lever connected to a cable in communication with the handle.

* * * * *

UNITED STATES PATENT AND TRADEMARK OFFICE
CERTIFICATE OF CORRECTION

| | |
|---|---|
| PATENT NO. | : 9,592,756 B1 |
| APPLICATION NO. | : 14/881473 |
| DATED | : March 14, 2017 |
| INVENTOR(S) | : Charles S. Hansen and Todd R. Muck |

It is certified that error appears in the above-identified patent and that said Letters Patent is hereby corrected as shown below:

In the Specification

In Column 3, Line 12, after "and dimensions" delete "similarity" and insert --similarly--, therefor.
In Column 4, Line 10, after "assembly 130" delete "similarity" and insert --similarly--, therefor.

Signed and Sealed this
Second Day of May, 2017

Michelle K. Lee
*Director of the United States Patent and Trademark Office*